United States Patent [19]

Brown et al.

[11] Patent Number: 4,851,818

[45] Date of Patent: Jul. 25, 1989

[54] ELECTRONIC CONTROLLER FOR A WATER PURIFYING UNIT

[75] Inventors: Barry M. Brown, Baldwinsville; Evan A. Edwards, Pittsford; William T. Fearnside, Fishers; Henry L. West, Rochester, all of N.Y.

[73] Assignee: Eastman Kodak Company, Rochester, N.Y.

[21] Appl. No.: 176,584

[22] Filed: Apr. 1, 1988

[51] Int. Cl.[4] .......................................... G08B 21/00
[52] U.S. Cl. ................................. 340/603; 73/865.9; 210/85; 324/442; 340/627; 340/657
[58] Field of Search ...................... 340/603, 627, 657; 210/85, 746; 324/442, 71.1; 73/865.9

[56] References Cited

U.S. PATENT DOCUMENTS 3,869,382  3/1975  Tejeda .................................. 210/85
3,990,066  11/1976  Malmgren ........................... 340/603

Primary Examiner—Glen R. Swann, III
Attorney, Agent, or Firm—Edward Dugas

[57] ABSTRACT

An analog ASIC (Application Specific Integrated Circuit) circuit has a power control section, a conductivity filter testing section, a light emitting diode (LED) driving section, and a bias section. The LED driving section is responsive to the conductivity filter testing section for indicating when the filter should be replaced. The power control section, conductivity filter testing section, LED driving section, and bias section are all operated in a controlled timed relation by a digital ASIC logic system to minimize power use.

25 Claims, 8 Drawing Sheets

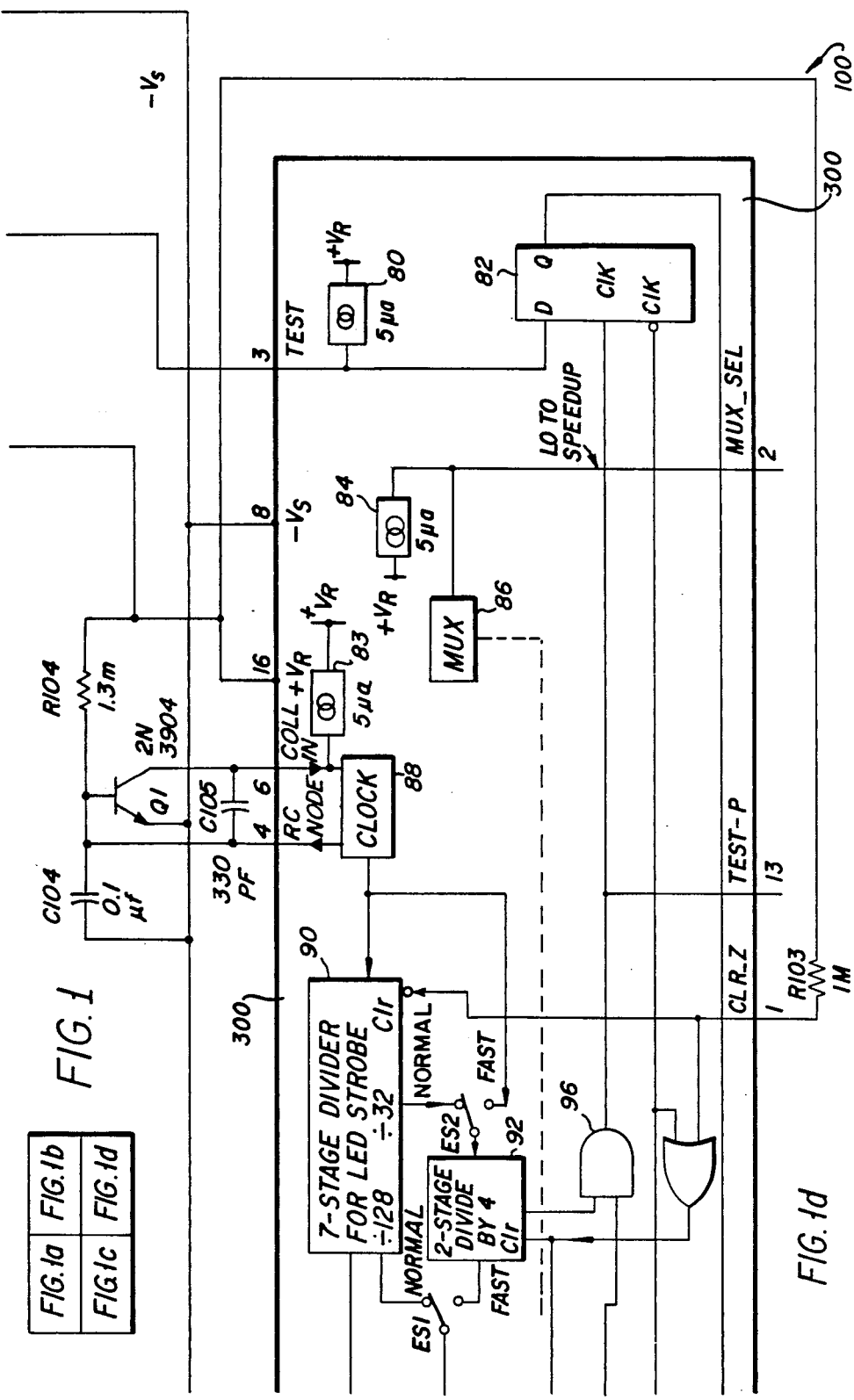

ELECTRONIC CONTROLLER FOR A WATER PURIFYING UNIT

CROSS REFERENCE TO RELATED APPLICATIONS

This application relates to applicants' copending applications Ser. No. 057,463, entitled "Water Purification System"(now abandoned; continuation-in-part application Ser. No. 195,560 filed May 18, 1988), Ser. No. 057,465, entitled "Water Purification System" (now abandoned), and Ser. No. 057,545, entitled "Reverse Osmosis Apparatus (now abandoned; continuation-in-part application Ser. No. 208,817 filed June 16, 1988).

BACKGROUND OF THE INVENTION

1. Field of the Invention

This invention relates generally to a water purifying unit incorporating a filter, and more particularly to an electronic controller for a water purifying unit for providing monitoring and test functions for indicating, for example, when the filter should be replaced.

2. Description of the Prior Art

With ever-increasing population and industrialization, the quality of the water supply for use in the home and work place is believed to have deteriorated, even though chemicals such as chlorine and the like, have been added to the water to improve it. Accordingly, a need exists worldwide for an economical water purification system for use in the home and work place to improve the quality of tap water for drinking, cooking, ice-making and the like. A need further exists for an electronic controller for such a water purification system for providing monitoring and test functions; the electronic controller being of simple design and low power consumption.

Some typical prior art water purification systems include, in addition to a filter in the form of a reverse osmosis membrane, a pre-filter for initial screening of the feed or tap water to protect the membrane from clogging, and a post-filter for further purification, especially for the removal of organics such as dissolved hydrocarbons. In general, in these systems, the tap or feed water is filtered and separated into purified water and waste water. Since the filters constitute a major restriction in the water purification system, the filtration process is relatively slow. Therefore, a system of a size which is economically and esthetically practical for the home and the work place is generally not able to generate adequate amounts of water on demand, but must include a water storage reservoir.

Over a period of time, the reverse osmosis membrane or filter will become less effective due to the formation of precipitates, scale, or particulate matter on the inlet side of the membrane. If this condition is not detected and corrected by replacement of the filter, the water purification unit becomes inefficient, and the quality of purification drops. Accordingly, a strong need exists in the industry for an electronic controller for a water purification unit which detects, among other things, when the filter should be replaced, whether there is tap water pressure in the unit, and whether the water storage reservoir is being filled.

The prior art, relative to water purification systems, includes U.S. Pat. No. 3,838,774, which issued to Dolan et al. This patent discloses an apparatus for monitoring water purification systems. The system typically includes an inlet chamber for receiving tap water, an outlet chamber for receiving purified water, and a membrane separating the inlet and outlet chambers for filtering the tap water as it passes from the inlet chamber to the outlet chamber. A conductivity sensing probe, operatively associated with the inlet side, senses the electrical conductivity of the tap water. A similar sensing probe, associated with the outlet side, senses the electrical conductivity of the purified water. The conductivity sensing probes are powered by an electrical source and a develop output signals that are compared against a known threshold. The output comparison is also viewable on a meter, recorder, and/or alarm device to continuously indicate the effectiveness of the filtering system.

In accordance with a specific embodiment of the invention of U.S. Pat. No. 3,838,774, the conductivity sensing probe on the inlet side is connected in the negative feedback path of an operational type amplifier and the conductivity sensing probe on the outlet side is connected across the negative and positive inputs of the amplifier. In accordance with these connections the output voltage of the amplifier is proportional to the ratio of the conductivity of the purified water to the conductivity of the tap water; which ratio, in turn, is a continuous measure of the relative impurity levels.

A serious disadvantage of the continuously-monitoring type systems disclosed in the prior art is that the power consumption for operating such systems is extremely high. Where batteries are used as the power supply, the high continuous current drain of such systems would soon drain the battery, requiring battery replacement, or a costly battery charging system to keep the battery fully charged.

A further disadvantage of the prior art systems is the lack of a straightforward means to compensate for the inevitable differences in probe calibration factors which may vary because of design, material and/or manufacturing differences.

SUMMARY OF THE INVENTION

It is a primary object of the present invention to provide an improved electronic controller for a water purifying unit.

The electronic controller of the present invention is particularly adapted for use with a water purifying unit of the type having a tap water inlet, a purified water outlet, a reservoir, a filter interposed between the water inlet and outlet through which the tap water passes for purification, a first conductivity probe in the tap water for sensing the salinity of the tap water, and a second conductivity probe in the purified water for sensing the salinity of the purified water. The first and second conductivity probes having a common input.

In a preferred embodiment of the invention the electronic controller is comprised of:

a current source coupled to the first and second conductivity probes for intermittently applying a current pulse thereto resulting in current signals from the probes in the ratio of the relative conductivities (salinity) of the water samples in which they are immersed; and electrical converting means for developing voltages indicative of probe currents; and voltage amplifying means to cause the voltage due to current in the second probe to be just equal to the voltage due to current in the first probe when the filter has just deteriorated to the point where it should be replaced; and electrical comparing means for comparing the voltage output signals from the first and second conductivity probe circuits and for generating a positive output voltage when the voltage output signal from the first conductivity probe exceeds the voltage output signal from the second conductivity probe circuit indicating that the filter is all right, and for generating a negative output voltage when the voltage output signal from the first conductivity probe circuit is below the voltage output signal from the second conductivity probe circuit for indicating that the filter should be replaced; and electrical switching means responsive to an input from the comparing means to clamp an output line to the negative supply rail in response to a positive input and to assume a high impedance state in response to a negative input indicative of a filter in need of replacement.

A further object of the present invention is to provide a battery operated electronic controller for a water purifying unit having digital circuit means for discretely limiting the operation of the electronic controller to reduce the current drain of the battery.

Still another object of the present invention is to provide an electronic controller which is activated when the reservoir of a water purifying unit is being filled.

Still another object of the invention is to increase battery life by intermittently actuating visual indicating means.

Still another object of the invention is to provide an electronic controller that is insensitive to drops in battery voltage.

The invention, its objects and its advantages, will become more apparent from the detailed description of the preferred embodiment presented below.

BRIEF DESCRIPTION OF THE DRAWINGS

The the detailed description of the invention presented below, reference is made to the accompanying drawings, in which:

FIG. 1 illustrates the proper arrangement of FIGS. 1a–1d;

- FIGS. 1a–1d comprise is a block schematic diagram of an electronic controller for a water purifying unit;

FIGS. 2a–2d comprise is an electrical circuit diagram of an analog chip used in the electronic controller of FIGS. 1a–1d.

DESCRIPTION OF THE PREFERRED EMBODIMENT

Figure 1A:
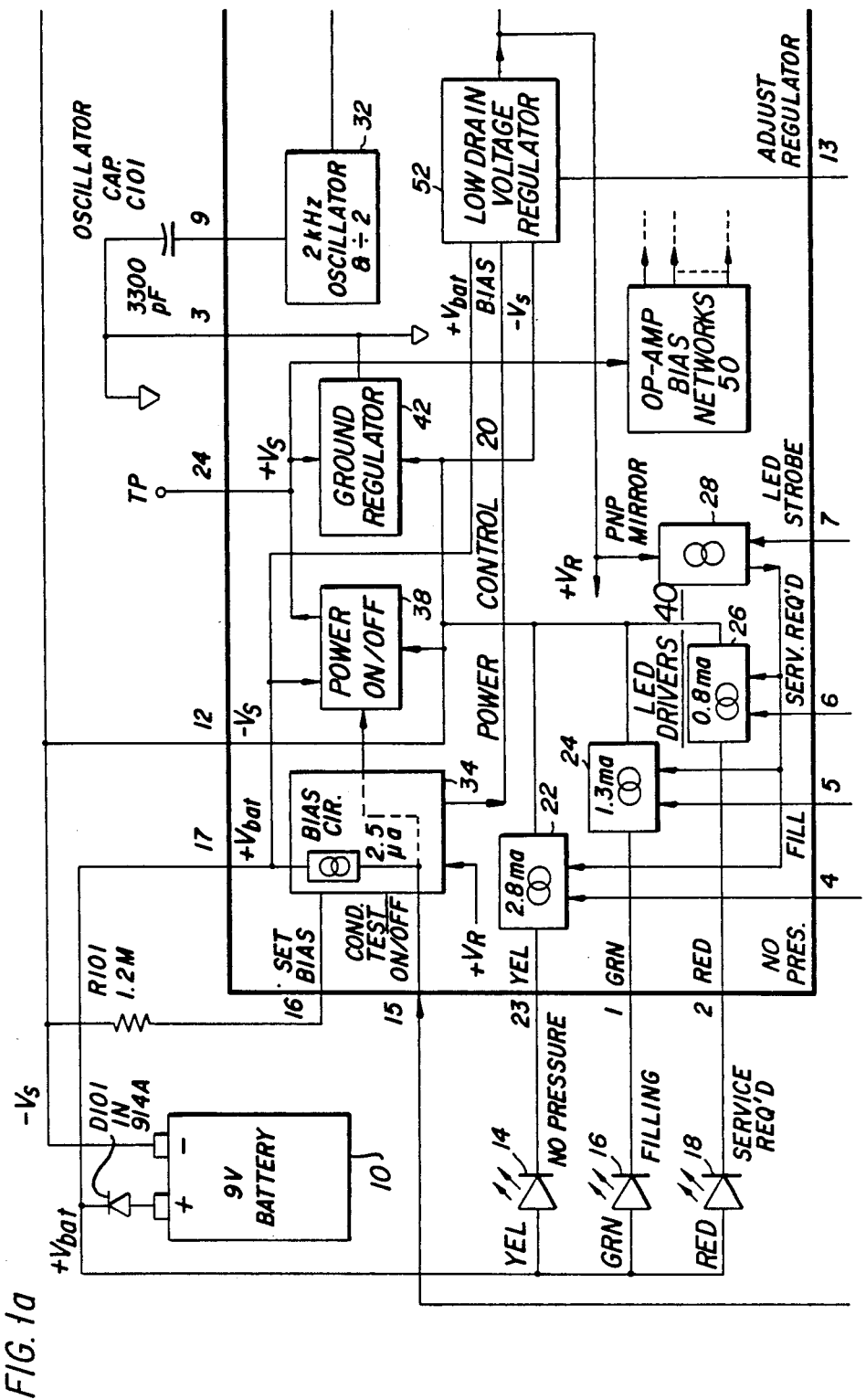
Figure 1B:
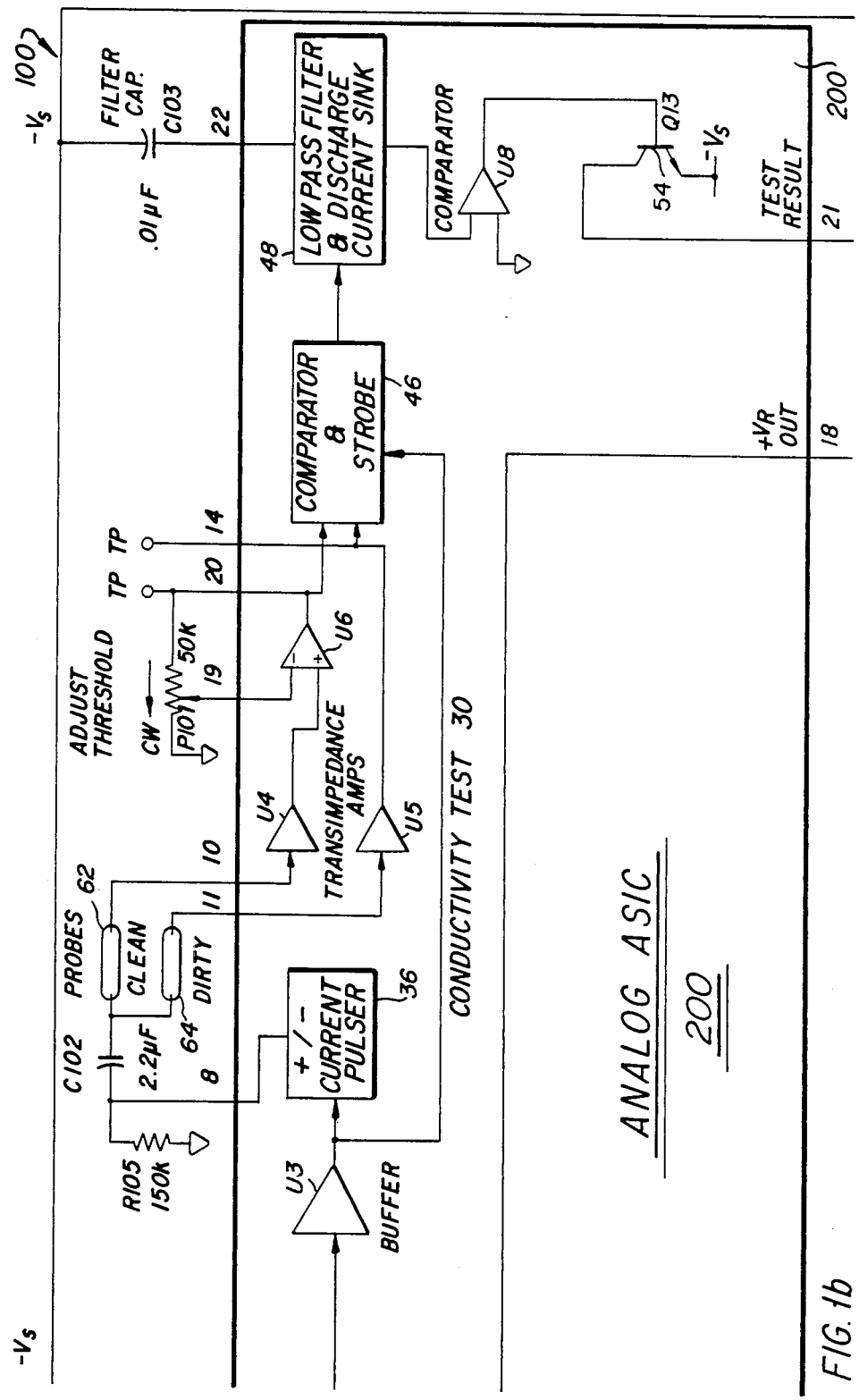
Figure 1C:
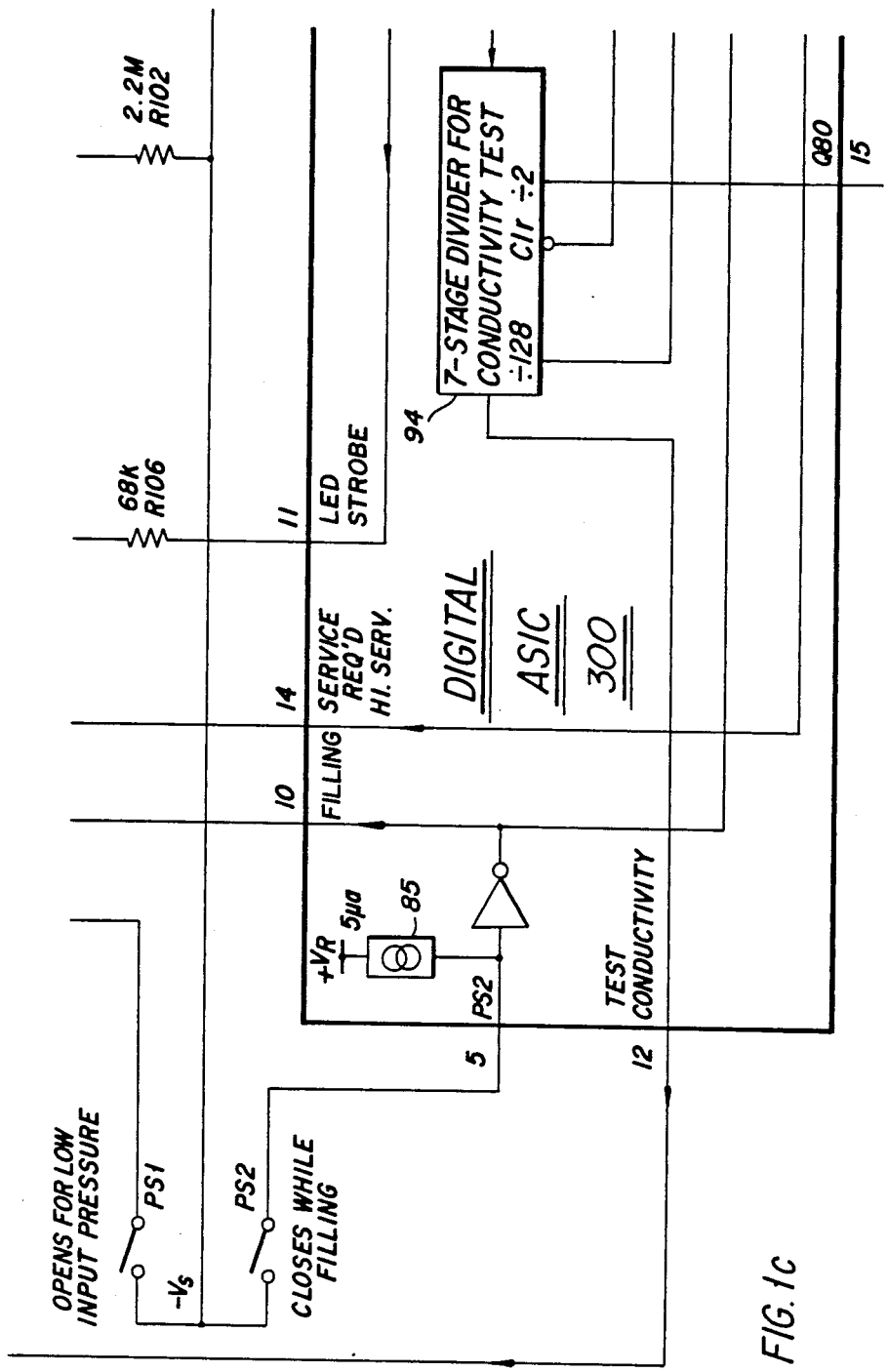

With reference to FIG. 1 of the drawings, the electronic controller 100 of the present invention is comprised of an analog chip 200 and a digital chip 300. The chips are application specific integrated circuits, commonly referred to as ASIC chips. In the preferred embodiment of the invention the analog chip 200 was fabricated by the Raytheon Co. from their basic RLA 80 series die as number (RA8034) ASIC chip and the digital chip 300 was fabricated by Texas Instruments as their CF61578 ASIC chip.

Although the preferred embodiment of the invention is disclosed in the form of ASIC chips it will be obvious to those persons that are skilled in the art that other forms of implementation may be used including discrete components.

The electronic controller 100 is powered by a single 9 v. lithium battery 10 which because of the low current drain of the controller will provide more than one year of service before replacement is needed.

THE ANALOG ASIC CHIP 200

The analog ASIC chip 200 has four principal sections: power control 20, conductivity test 30, LED drivers 40, and bias networks 50.

The power control section 20 has two major functions; first, it is a very low drain voltage regulator for providing a constant +5 V. to the digital ASIC chip 300, and second it performs a switching function for turning on supply power in response to a conductivity test signal. The first function is necessary in order to keep the current drain of the digital ASIC chip 300 to a consistently low value even when the battery is fresh. The digital ASIC chip 300 would have a higher current drain at voltages above 5 volts and may even be damaged by the full voltage of a fresh 9 volt battery. The second function is performed by an electronic switch that is activated by a conductivity test signal from the digital ASIC 300 to turn on the supply power to the conductivity test 30 and bias networks 50 section of this chip when a conductivity test is to be performed and to turn off the supply power at the end of the test. This function is necessary because the conductivity test section 30 has a large current drain (2–4 ma) and is therefore activated for only 4 seconds of each 8-minute cycle during a reservoir fill cycle. (details of this operation will be described later in the specification) Also, because of battery life considerations, it is necessary that the power control section 20, which is on-line all the time, have a very low current drain. The power control section 20 additionally generates an artificial electrical ground potential Vg which is midway between the negative battery terminal potential −Vs and the switched positive battery supply voltage +Vs for a purpose to be designated hereinafter.

The conductivity test section 30 measures the ratio of the conductivity of the purified water to the conductivity of the tap water. When this ratio rises above a selected predetermined value, the membrane or filter part of the unit is deemed to be spent and a "failed" test result is communicated to the digital ASIC chip 300. The digital ASIC chip 300 will then change the "service required" status line to cause a "service required" LED 18 to flash.

The conductivity test circuit 30 is connected to a pair of conductivity probes 62 and 64 by means of a d.c. isolation capacitor C102, at one common end, and by transimpedance amplifiers U4, and U5, respectively, at the other end. The isolation capacitor C102 is used to prevent a d.c. current from flowing through the probes which would cause an electrolysis which would affect probe calibration. Accordingly, a 2 KHz. oscillator and divided by 2 circuit 32 is used to generate a 50% duty cycle square signal at 1 KHz. A buffer U3 receives the 1 KHz square wave signal and provides at its output a signal which is strong enough for actual pull-up and pull-down operation of a current pulser circuit 36 and a comparator and strobe circuit 46. The current pulser 36 excites the probes from one common end with a 50% duty cycle, bi-directional square wave of current, so that the current will divide between the two probes exactly in proportion to their conductivities. This division is assisted by the fact that the transimpedance amplifiers U4 and U5 receive the conducted current at virtual ground summing junctions. The output signal from amplifier U4 is further amplified by amplifier U6, as it is the smaller of the two conducted currents, to be nominally equal to the larger signal when at the threshold value. Amplifier U6 at its negative input is connected to the wiper of the threshold gain adjust pot P101 whose gain setting determines the threshold value for the PASS/FAIL conductivity test. The comparator and strobe circuit 46 compares the outputs from the transimpedance amplifier U4 and the output of transimpedance amplifier U5 which has been amplified by amplifier U6 to provide an output indicative of the difference between the two inputs, if any. The output signal from the comparator and strobe circuit 46, after filtering by the low-pass filter and discharge current sink 48, is used to activate switch 54, via a comparator U8. The switch 54 provides the test result signal to the digital ASIC chip 300 by clamping to the potential −Vs if the test is passed OK and to a high impedance if the test is failed.

The LED Drivers section 40 provides for the constant current control of the LED indicators 14, 16 and 18 when they are flashed through enablement of (constant current) drivers 22, 24 and 26, respectively, and the occurrence of a strobe signal from LED strobe circuit 28. The LED's are enabled to turn on for 15 ms of every 2 seconds during the time that a pressure switch (PS1) is closed and that a status line such as fill or service request is activated and the LED strobe signal is received. It is the LED "strobe" signal that is received from the digital ASIC via the strobe circuit 28 which pulls down to −Vs to actually complete the turn on of the LED's. When the LED "strobe" is not pulled down to −Vs, the entire LED driver section 50 turns OFF so that there is no current drain. The constant current drive is necessary so that there will not be excessive current drain to the LED's when the battery is fresh. Also each LED (constant current) driver is set to provide a particular level of current drive according to the color of the attached LED; 0.8 ma for red, 1.3 ma for green, and 2.8 ma for yellow. The red LED flashes when service is required, that is, the filter is dirty and should be replaced. The green LED flashes when a reservoir pressure switch PS2 is closed indicating that the reservoir is filling with purified water. The yellow LED flashes when the tap or feed water inlet pressure switch PS1 is open indicating that the tap water is under low or no pressure.

Figure 2:
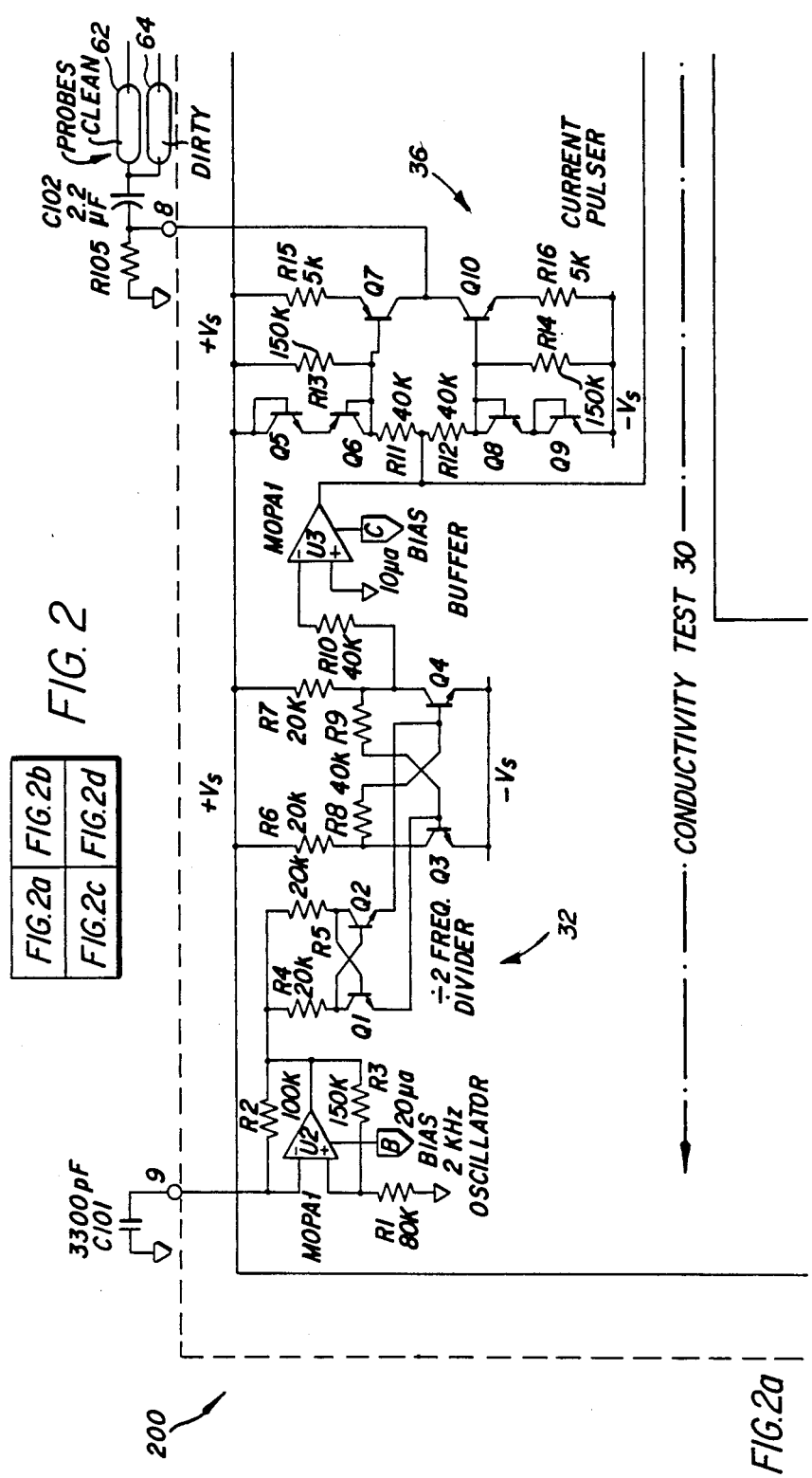
FIG. 2 illustrates the proper arrangement of FIGS. 2a–2d.
Figure 2B:
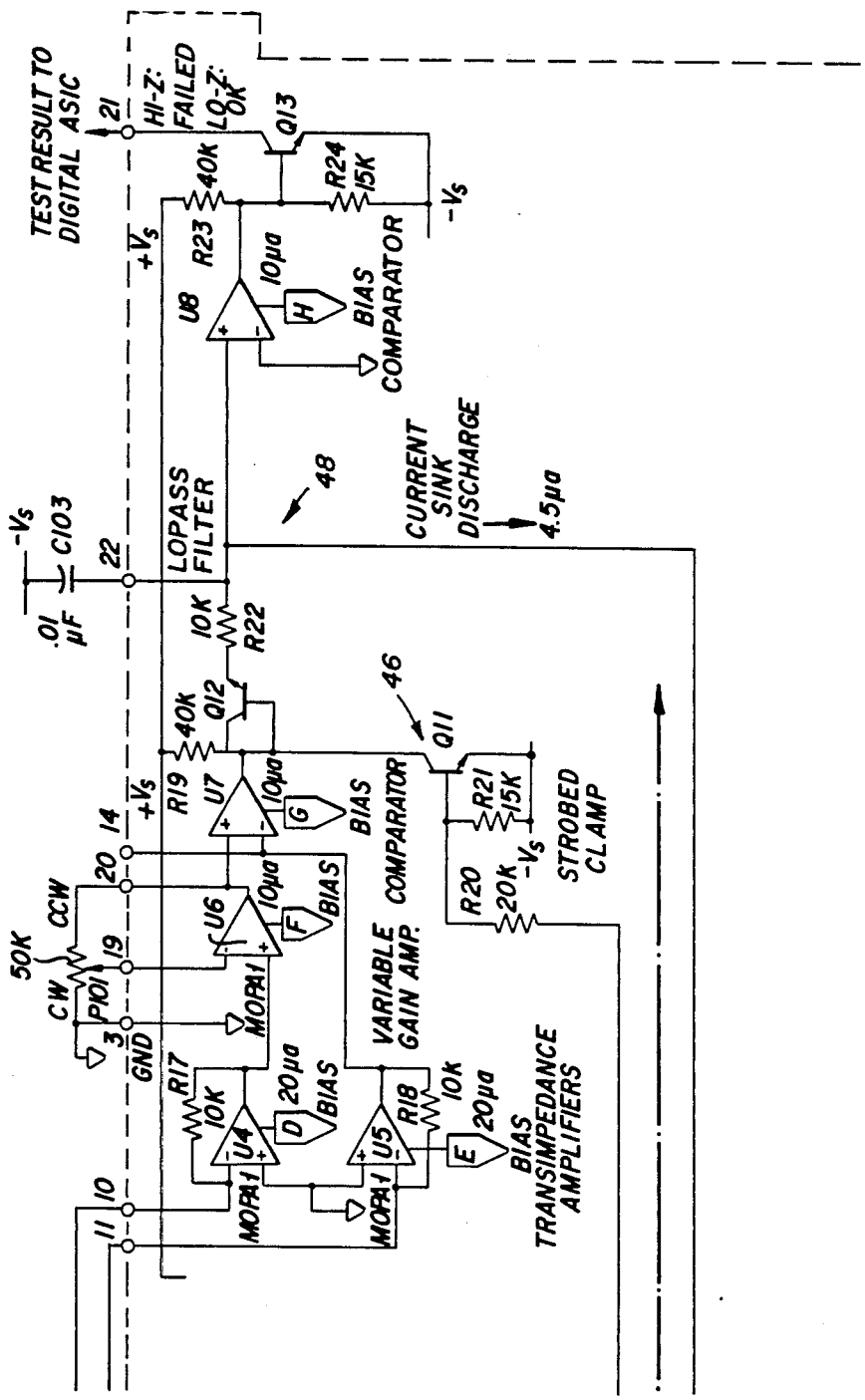
Figure 2C:
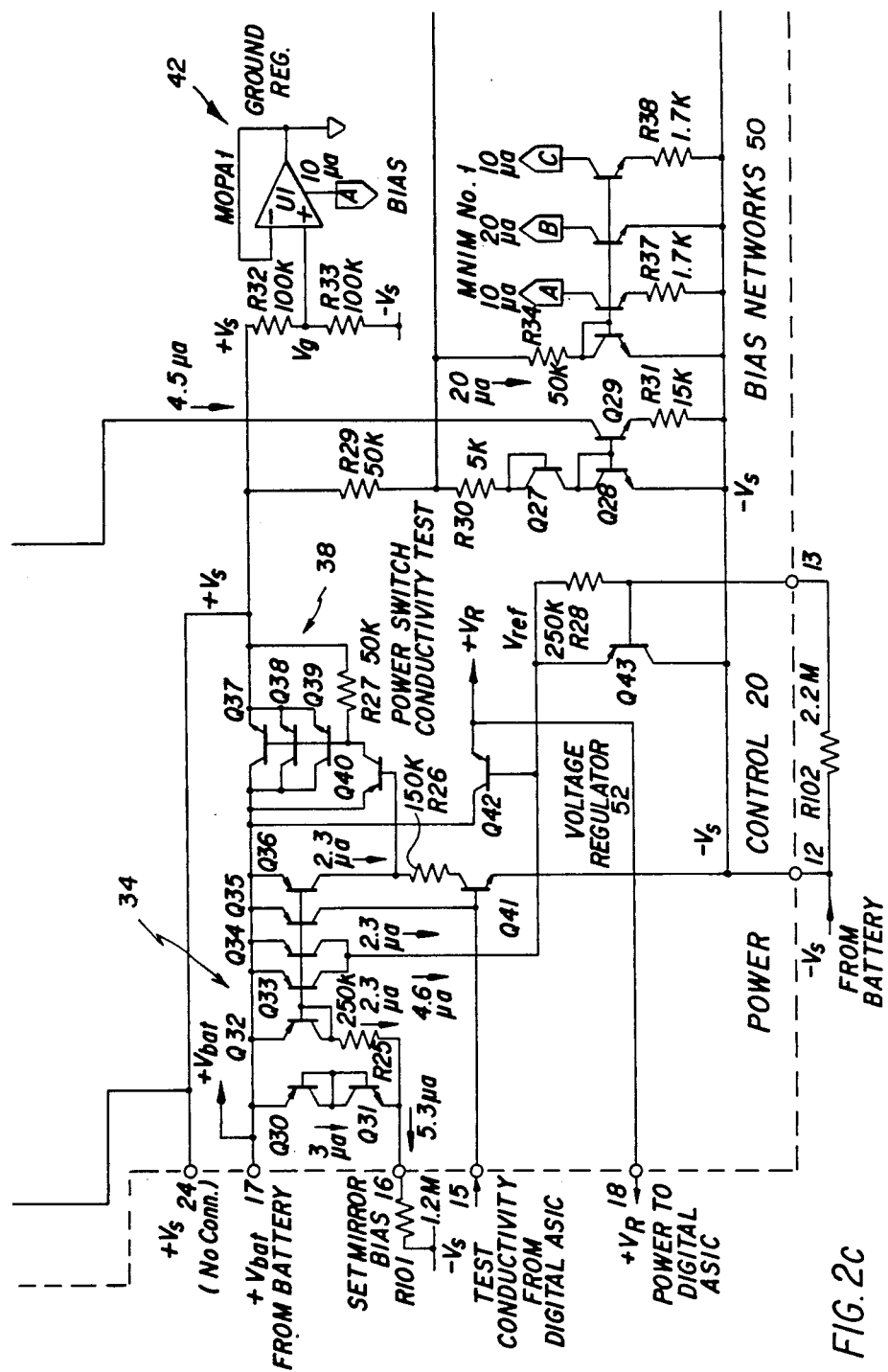
Figure 2D:
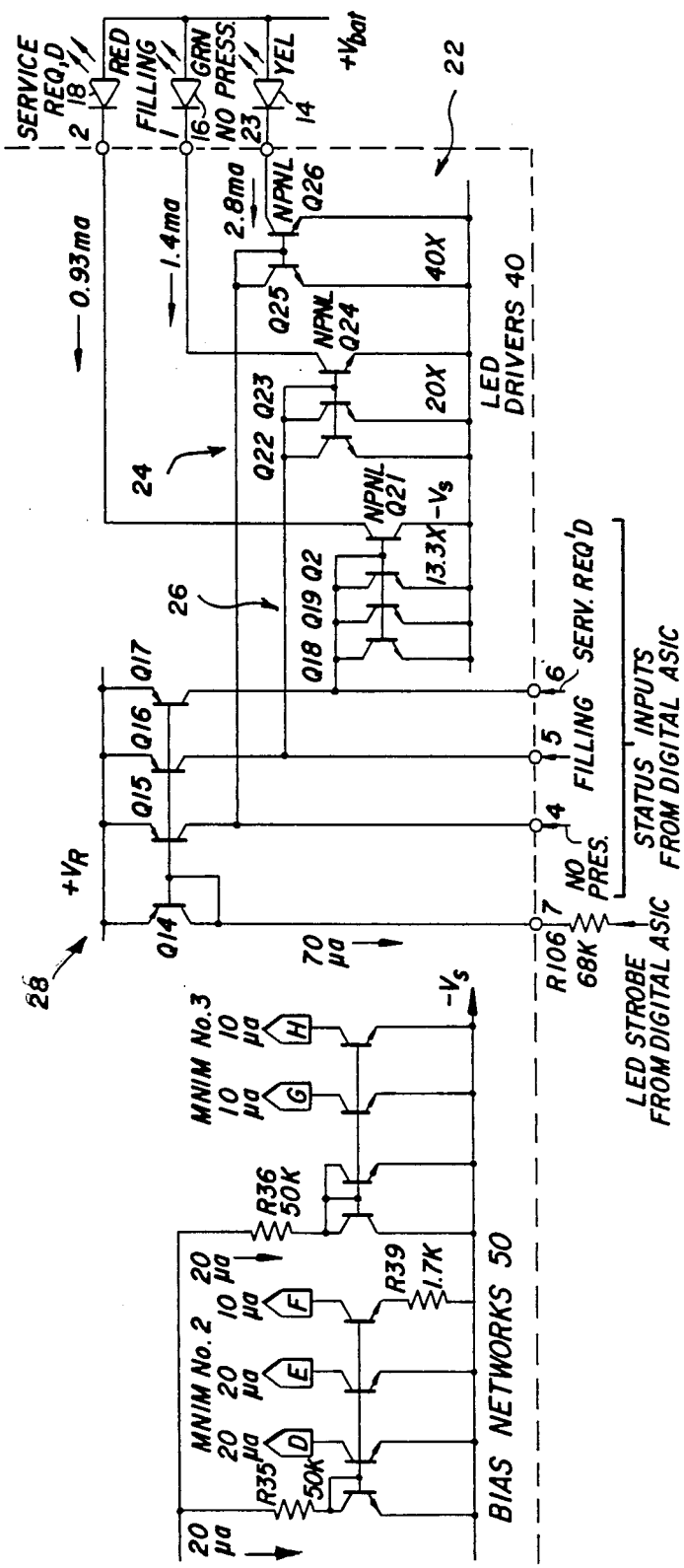

The bias networks section 50 is activated when the conductivity test comes ON to provide bias current to all of the amplifiers, U1 through U8, in the analog ASIC chip 200 (shown in FIG. 2). The prior description has been related to the system in general and specifically to the function of the major sections of the analog ASIC chip 200. The following description will be directed to a detailed circuit level description of the analog ASIC chip 200 made with references to the circuitry shown in FIG. 2 which references will be grouped under the major circuit sections used in the description of FIG. 1.

Power Control Section 20

This section includes the low drain voltage regulator 52 for the supply voltage for the digital ASIC 300 and the electronic power switch 38 for the conductivity test circuit 30. In addition, there are bias current sources consisting of transistors Q30-Q36, which form the bias circuit 34 and the ground regulator which is based on an operational amplifier U1.

Because the battery voltage will drop from 9 V to about 5 V during the life of the battery, the bias circuit 34 is designed to minimize the variation of output currents as the battery ages. This circuit, is a multiple-output current mirror, with one of the outputs, Q33 and Q34 being a 2x current output by virtue of paralleling two transistors of the same die size as used for transistors Q35 and Q36. The current sources work from an input reference voltage consisting of two Vbe drops below +Vbat that occurs in transistors Q30 and Q31. The Vbe drop of transistor Q32 will offset the Vbe drop in Q30 thus leaving a net reference of one Vbe drop from Q31. The input current to the multiple output mirror then is determined by one Vbe drop divided by the resistance of R25 which is approximately 2.3 ua. Transistors Q33 and Q34, being in parallel will source about 2×2.3 ua which euqates to 4.6 ua, but Q35 and Q36 will each mirror the 2.3 ua input current. Due to variations in +Vbat the current to Q30 and Q31 will vary considerably as the battery ages, but the source currents from Q32-Q36 will vary only slightly with battery life since the mirror input current is determined by R25 and one Vbe drop which will change only slightly with the input current to Q30 and Q31. The 4.6 ua output current is used to bias the voltage regulator reference circuit and the 2.3 ua output current of Q35 is used as a pull up on the TEST CONDUCTIVITY input from the digital ASIC 300. Because that pull up source connects to the base of Q41, the TEST CONDUCTIVITY input can never pull up to more than Q41's Vbe so the digital ASIC 300 TEST CONDUCTIVITY output will never be exposed to the full +Vbat. The external 1.2M resistor R101 is used because there are no high value resistors available on the ASIC dies.

The voltage regulator 52 is a simple emitter follower regulator using Q42 as a series pass transistor. The reference voltage at the base of Q42 is developed with a Vbe multiplier consisting of Q43, R28, and R102. When the voltage across R28 allows Q43 to turn ON, Vce will be clamped and further increases will just turn Q43 on harder through the resistive voltage divider, thereby shunting more of the available 4.6 ua of bias current coming from current source Q33 and Q34. R102 is external because of its high value and to allow programming the clamp level of the Vbe multiplier, thereby setting the regulator output voltage.

The power switch for the conductivity test uses three NPNS transistors in parallel Q37-39 which are driven by a PNPS transistor Q40. Current source Q36 to the base of Q40 and resistor R27 from the base to emitter of Q37-39 assures complete turnoff when the switch is open. The switch will close whenever the signal on the TEST CONDUCTIVITY line is high (impedance) and the 2.3 ua bias current from Q35 has turned on Q41 which in turn turns on Q40 and Q37-Q39. The output +Vs at the emitters of Q37-Q39 will be a few tenths of a volt below +Vbat.

Since the conductivity test circuits are set up for split supplies, the ground regulator 42 is configured to force the mid-point voltage between +Vs and −Vs to be at ground potential. The mid-point is determined by the voltage divider of R32 and R33 whose common node feeds the + input of the operational amplifier U1. It should be noted that the battery terminal voltages are otherwise free to float with respect to ground except for the action of the ground regulator which is active only during the conductivity test. Furthermore, the −Vs terminal is the common supply point between the analog ASIC chip 200 and the digital ASIC chip 300 and therefore the digital ASIC power is essentially floating with respect to ground most of the time.

Conductivity (Filter) Testing Section 30

The purpose of this section is to periodically test the conductivity of the incoming (dirty) and processed (purified) water, and to enable the LED 18 when the processed water conductivity exceeds 25% or other selected threshold percentage of the incoming water conductivity. Besides low battery drain, two other considerations influenced this design.

First, the conductivity of the incoming water as indicated by the resistance of probe 64, ranges from 476 ohms to 25K ohms, a ratio of over 50:1. If the signals to be compared for ratio were to each have a 50:1 range, then it would be difficult to maintain good gain accuracy for the small signals in the presence of voltage offsets and offset bias currents in the operational amplifier stages. Therefore, the probes 62 and 64 are excited with a current source so that when the measured currents are converted to voltages by transimpedance amplifiers U4-U5, the sum of the two signals would be a constant rather than ranging over a 50:1 ratio.

Secondly, d.c. current should not be allowed to flow in probes 62 and 64 because the resulting electrolysis could affect probe calibration. Accordingly, the probes are excited with a 50% duty-cycle bidirectional square wave of current which is capacitively coupled (to eliminate d.c.) to the probes. By exciting the probes from a common drive source at one end and receiving the conducted current at the virtual ground summing junctions of operational amplifiers U4 and U5 configured as transimpedance amplifiers at the current end, the current will divide between the two probes exactly in proportion to their conductivities. These currents are then converted to voltages which are compared for ratio by amplifying the smaller signal to be nominally equal to the larger signal when at threshold and then by comparing signal magnitudes.

The test chain begins with a 2 KHz oscillator which includes U2,C101, and R1-R3. A small positive feedback voltage is provided by the voltage divider R3 and R1. Negative feedback voltage is provided through R2 but is delayed by the charging or discharging of C101. Because of this delay the output of U2 is always at a supply rail trying to either charge or discharge C101, and hence the square wave oscillator action.

When this frequency is logically divided by two, an exact 50% duty cycle at 1 KHz will result. The 2:1 frequency divider is a double rank flip-flop. The input flip-flop includes Q1,Q2 and R4,R5 and serves to route positive clock transitions to only one side of the output flip-flop at a time. The output flip-flop includes Q3,Q4 and R6-R9. Assume for the moment that in the output flip-flop Q3 is ON and Q4 is OFF—This means the base of Q4 and hence the emitter of Q2 is at a lower voltage than the base of Q3 and the emitter of Q1 so when a positive clock transition feeds through R4 and R5 towards the input flip-flop, Q2 will begin to turn ON first. As soon as Q2 starts to turn ON, the base voltage of Q1 will be lowered thus keeping Q1 OFF as long as the clock input remains high. Since Q2 has turned ON, a positive voltage will feed through to the base of Q4 to turn on Q4, thus changing the state of the output flip-flop. When the clock goes low nothing will change, and then at the next positive clock transition a similar action takes place except that Q1 and then Q3 will turn ON thus changing the state of the output flip-flop again. The output of the divider is taken from the collector of Q4 through isolation resistor R10 to the buffer U3.

The buffer U3 is a comparator formed from an operational amplifier so that the output will have active pull up and pull down capability with which to feed the current pulser 36.

The current pulser 36 is a pair of programmable current sources each with an additional resistor R13 and R14 connected between the base and the emitter circuit common of the output transistors Q7 and Q10 to assure complete and rapid turnoff as the opposite side of Q7 and Q10, respectively, turns ON. For the positive current source comprising Q5-Q7 and R11, R13 and R15, the net reference voltage is Vbe of Q5 so the output current at the collector of Q7 will be about 120 ua.

$$Iout = Vbe/R15 = 600 \, mv/5K \, ohms = 120 \, ua$$

The negative current source is complementary to the positive current pulser except that the net reference comes from Vbe of Q9, which is an NPNS transistor as was Q5 in the positive pulser. The negative current source is comprised of Q8-Q10 and R12, R14 and R16. Thus the reference voltage, for each polarity pulser, comes from the same transistor type working at the same current level so that current magnitudes of the two polarities do match closely.

If the current pulser output, at the junction of the collectors of Q7 and Q10, were connected only to the probes' coupling capacitor C102, then a slight imbalance between positive and negative current pulses would eventually cause a d.c. charge to build up on C102 until one of the current pulsers had insufficient voltage headroom to inject 120 ua through the probes. Therefore, external resistor R105 is connected to ground from the pulser output to slowly bleed off any charge accumulating on C2.

The injected current passes through probes 62 and 64 and is received at the summing junctions of operational amplifiers U4 and U5. These amplifiers, with 10K feedback resistors R17 and R18, convert the received current pulses to a voltage at a gain of 10K volts/amp (10 mv/ua). Since the summing junctions are both at virtual ground and the probes are driven from a common source point, the current spilt between the probes will be exactly in proportion to their conductivities. At threshold (25% conductivity, for example) the smaller (clean) signal will be 25% (100%+25%)×120 ua×10 mv/ua=240 mv. Different input voltage offsets between amplifiers will then introduce error at the rate of 1/240=0.42% per millivolt. Since typical offsets are 0.5 mv per amplifier, an error of 1 mv would give an acceptable low 0.42% error. The larger dirty signal, at threshold, at the output of U5 will be [100%/(100%+25%)])×120 ua×10 mv/ua=960 mv so even when the battery is low (giving a supply of about +/−2.4 V) this signal will not drive the output of U5 to the supply rail.

The worst error condition occurs for highly conductive (very dirty) water because the driving voltage developed by the current pulser 36 will be quite low. Under these circumstances the probe resistances would be about 500 and 2000 ohms giving an equivalent parallel resistance of 400 ohms through which the 120 ua has to be driven. The driving voltage would then be 120 ua×400 ohms=48 mv, and if the summing junctions are 1 mv apart, as noted above, then the error will be 1/48=2.1%.

In order to detect the threshold, the 240 mv "clean" probe 62 signal at the output of U4 is amplified until at threshold it would nominally match the 960 mv "dirty" probe 64 signal and could be monitored by a comparator. That gain is provided by operational amplifier U6 which is adjusted to have a nominal gain of 4 through potentiometer P101. If a threshold different from 25% is desired, then the potentiometer P101 can be adjusted to give a different gain and hence equivalent threshold. For the nominal case:

Req'd Gain=100%/threshold %=100/25=4

Next the two signals are compared by a comparator U7 whose open collector transistor output is pulled up by R19. Because the probes are being pulsed with both current polarities to avoid electrolysis, the sense of the comparator output will reverse between the two pulse polarities. It is therefore, necessary to suppress the comparator output when it has the unwanted polarity. This is accomplished by Q11 which shorts the comparator output to the −Vs rail while the negative current pulse is being applied to the probes.

During the positive current pulse the comparator inputs will both be negative, and if the amplified "clean" signal at the output of U6 is smaller than the "dirty" signal, the comparator output will pulse positive indicating an OK condition. Otherwise, the comparator output will remain negative, near −Vs rail, indicating a failed or dirty filter condition. Positive pulses, indicative of an OK condition, are rectified by the base-emitter junction of Q12 to charge the low-pass RC filter of R22 and C103. If the voltage on C103 remains positive, then the filter is OK. The 4.5 ua discharge current from Q29, a constant current sink, will bleed down C103 towards −Vs if the test starts to fail. The current sink is used to avoid another high value external resistor. When the battery is fresh, Q12 may "zener" slightly between positive pulses from the comparator U7 but, nonetheless the voltage on C103 will remain positive at about +6.5 V above −Vs. So if the voltage on C103 is positive the filter is OK, otherwise the voltage on C103 is negative for a failed condition.

Comparator U8 monitors the voltage on C103 to provide a positive output if the filter is OK or otherwise to clamp to −Vs for a failed condition. This output drives Q13 which then clamps the signal on the TEST RESULT output line to −Vs, for an OK condition or goes to high impedance to indicate a failed condition. The signal on the TEST RESULT output line goes to the digital ASIC chip 300 for storage during the time between conductivity tests and the most recent stored test result is returned as a signal on the SERVICE REQUIRED line to the LED drivers 40.

LED Drivers Section 40

This section has two major parts; the strobe/status current mirror 28, and the LED driver gain mirrors 22, 24 and 26. The current mirror 28 turns the whole section ON, from a zero current drain standby condition, between flashes of the LED's. The current mirror 28 also provides input current sources to the LED driver gain mirrors. Any status input line which is pulled down to −Vs by the status input from the digital ASIC will shunt away the bias or pull up input current that would otherwise feed the driver gain mirror thereby preventing the attached LED from being turned ON. Thus the LED's whose status inputs from the digital ASIC are at a HI impedance are enabled to flash ON when the LED strobe pulls low through R106. Between flashes the input current mirror shuts OFF to minimize battery drain.

The driver gain mirrors rely for current gain upon the approximately 40x ratio of emitter areas between the NPNL output transistor and the NPNS transistors on the input side. Since these transistors are all on the same die the current gain versus Vbe characteristics will all closely match on a per unit emitter area basis. Each gain mirror will have a nominal current gain equal to the ratio of output emitter area to input emitter area. If more than one NPNS transistor is used on the input side, then the mirror gain will be reduced because that ratio of output area to (now larger) input area will be reduced. Since these LED drivers are acting as constant current regulators, only a specified amount of current can reach each LED according to its color, regardless of the magnitude of +Vbat which will drop from 9 V to 5 V as the battery ages. Without current regulation, the LED current would have to be specified for the low, end of life value of +Vbat with the result that higher currents would flow when the battery was fresh, thereby accelerating battery aging during the first few months of service.

The current mirror 28 is comprised of transistors Q14–Q17 and external resistor R106. It is a conventional current mirror which relies on the matching of transistor characteristics, particularly Vbe vs Ib and current gain, to affect multiple current sources whose current output closely matches the input current. R106 will set the collector current of Q14 at about70 ua when the signal on the LED STROBE line goes active low. This will allow the collectors of Q15–Q17 to each source an approximately equal 70 ua. Note that the emitters of Q14–Q17 are tied to +Vr, the regulated digital ASIC supply voltage. This is to prevent drawing any current in the mirror when the LED STROBE signal is high (at +Vr which is less than +Vbat) and to avoid over voltage on the LED strobe divider 90 on the digital ASIC chip. Each output current from the mirror, at the collectors of Q15–Q17, is a pull up source for a status input line line and if not shunted to −Vs by the status input line, will feed an outout gain mirror as described above whose gain is determined by emitter area ratios as follows:

YELLOW mirror gain=40[NPNL]/[NPNS]=40
GREEN mirror gain=40[NPNL]/2×1[NPNS]=20
RED mirror gain=40[NPNL]/3×1[NPNS]=13.3

Since the current mirror 28 delivers about 70 ua at its outputs, the current drawn through the LED's is thus:

YELLOW current=70 ua×40=2.8 ma
GREEN current=70 ua×20=1.4 ma
RED current=70 ua×13.3=0.93 ma Note that the output currents for all the LED's are scaled from the LED strobe current which depends on +Vr and R106. If it is desired to adjust display brightness one can simply change R106 which will now set a new input mirror current at Q14 collector then all the LED currents will scale together but in the same ratio as before so that the apparent visual brightnesses of the LED's will track together.

Bias Section 50

This section includes various constant current sinks to the −Vs rail as required by other circuits on the chip. There are four mirror circuits in this section. They receive input current through resistors R34, R35 and R36 tied to the node joining R29 and R30 which node is intended to operate at Vbe+1 volt=1.6 volts above −Vs.

Consider first the MNIM networks #1, #2, and #3. These networks are connected via their labeled outputs to like labeled bias inputs of the operational amplifiers and comparators. MNIM #3 is the simplest network being a conventional NPN current mirror. R36 will have 1 volt across it so 20 ua fill flow into the mirror. Because there are two input transistors in parallel each transistor will be sinking 10 ua individually. Since the transistors in the network all match for gain and Vbe vs Ic, and since the outputs G and H are derived from single transistors they will each sink an identical 10 ua.

MNIM #2 looks similar to MNIM #3, except that the input current through R35 will flow through a single transistor and will amount to 1 volt/50K=20 ua. Outputs D and E will each mirror the 20 ua input current, but the transistor for output F has an emitter resistor R39 which will cause F to sink less current than the other transistors in that network. The value of R39 is determined by first calculating the reduction in Vbe for that transistor and finding the resistor which will drop that much voltage for the new desired value of sink current. For example if a 10 ua output is desired:

$$\Delta Vbe = 26\,[mv]\,1n(Iout/Iin) = 26\,1\,n(10\,ua/20\,ua) = -18\,mv.$$

Resistor R39 must then drop 18 mv since Vbe for the F transistor is now reduced so:

$$R39 = 18\,mv/10\,ua = 1.8K\,ohms$$

which is close to the 1.7K value specified.

MNIM #1 is the same as MNIM #2 except that the two outputs A and C are reduced to 10 ua.

The current mirror of Q27–Q29 serves two purposes: first to provide a discharge current sink for C103 and second to partially stabilize the node joining R29 and R30 against variations in voltage between −Vs and +Vs. Because there are two Vbe's (Q27 and Q28) on the input side and because the node joining R29 and R30 is intended to be at 1 volt +Vbe, there will only be about 1 volt+Vbe−2 Vbe=0.4 volts across R30 so about 80 ua will flow into the mirror. If +Vs rises, the current in R30 will rise more rapidly percentagewise than the current in R34–R36, and R31, with the result that the Q27–Q29 current mirror absorbs most of the extra current due to a rise in +Vs sending more current through R29. The value of R31 is calculated the same way as R39 was calculated above:

$$\Delta Vbe = 26\,[mv]\,1n(Iout/Iin) = 26\,in\,(4.5\,ua/80\,ua) = 75\,mv$$

$$R31 = 75\,mv/4.5\,ua = 16.6K$$

which is close to the 15K value specified. The sink current into Q29 will vary considerably with changes in +Vs but the magnitude of this current is not critical. R29 is chosen to allow about 130 ua (the sum of the nominal mirror input currents) to flow when +Vs is 8 volts above −Vs.

THE DIGITAL ASIC CHIP 300

With reference to FIG. 1, the digital ASIC chip 300 generates timing and status commands which are passed on to the analog ASIC chip 200. It also receives status inputs from the pressure switch PS2 and the analog ASIC chip 200. The signals this chip passes to the analog ASIC chip 200 initiate the conductivity ratio test and determine the status of the message display LED's which are lit by the analog ASIC chip.

Signal inputs of the digital ASIC chip will have either an external pull up resistor or an internal pull up current source from +Vr so that an input not otherwise connected will be at a logical high to prevent the possiblity of drifting into an indeterminate logical state. The clear input for example uses an external pull up resistor R103 for this purpose. All other signal inputs use internal pull up current sources 80, 83, 84, and 85 or under 5 us each from +Vs. These pull ups, which typically source from 1.5 to 3.2 uA depending in input terminal voltage level, also prevent the inputs from being left in a noise vulnerable high impedance state.

Outputs from the digital ASIC chip in a low state will have no more than 200 ohms resistance to the −Vs supply with an offset of less than +500 mv. Outputs in the high state will be high impedance with leakage or source currents of less than +/−1 ua for applied voltages between −Vs and +Vr.

The clock circuit includes an external RC network and a gain transistor feeding an on-clip MOS buffer and open-drain FET. This configuration is necessary because the available standard cell oscillator draws several hundred microamps while oscillating, which is not acceptable under our power requirements specification. With the available standard cell oscillator, the voltage at the node joining R104 and C104 feeds the on-chip buffer which then discharges C104 when the input to the oscillator block rises above the input device threshold. This mode of operation for the standard cell oscillator puts the input device in its linear range virtually all the time under which conditions the oscillator draws the large current noted.

The oscillator configuration shown uses an external common emitter pain transistor, Q1, with its base connected to the node joining R104 and C104 and the collector feeding the on-chip buffer. In this arrangement Q1 will not turn ON until the voltage at the base rises to about 0.6 V, then when it does turn ON, the collector voltage will fall very rapidly owing to the transistor voltage gain. This rapidly falling collector voltage quickly pulls down the input to the on-chip buffer taking it very quickly through the linear region so that high current is drawn only momentarily so the output open FET now discharges C104 to −Vs. Reset capacitor C105 holds the input to the on-chip buffer LOW long enough for C104 to be discharged before the buffer input again sees a HI level which soon occurs as the on-chip 5 uA pull up current source charges up C105. The charge rate of C105 is fast (5 uA/330 pF−15 kV/sec) so that the on-chip buffer input passes through the linear regionin a fraction of a millisecond. Thus the on-chip buffer input is in the linear region for only a fraction of a percent of the time so the overall current drain is reduced to an acceptably low value of about 20 uA when the oscillator runs at 66 Hz.

The other part of the on-chip clock circuit is a toggle flip-flop so that its output will be a 50% duty cycle at 33 Hz. A half cycle of this output takes 15.1 ms and is used to gate the LED-STROBE output signal.

The 7-stage divider chain 90 runs continuously to provide a low duty cycle LED STROBE signal which is low for about 15 ms once every 2 seconds and which is hi the rest of the time. This strobe signal allows the analog ASIC to flash the LED indicators for this same 15 ms according to the status outputs connected from the digital ASIC to enable inputs on the analog ASIC.

A second 7-stage divider 94 is provided to initiate a water conductivity test for 4 seconds at the end of every 8 minutes of elapsed time while the reservoir is filling. An 8 minute delay is built into the system to compensate for temperature changes. The input to this 7-stage divider chain is normally taken via the normal output of multiplexer switch ES1 from the ($\div 128$) output of the divider chain 90. A second 2-stage divider 92 is part of this section and noramlly receives its input via ES2 from the 5th stage ($\div 32$) output of the divider chain 90. The 2-stage divider 92 and the divider chain 90 together feed an AND gate 96 to create a COPY pulse to clock TEST RESULT data from the analog ASIC into a test memory flip-flop 82 during the 4th second of the conductivity test. This delay provides an opportunity for the initial transient responses to settle down. An input from pressure switch PS2 will be hi while not filling and under these conditions the conductivity test divider 94 and the test result memory flip-flop 82 will be held reset. Once PS2 goes low, indicating the reservoir is filling, the divider 94 will be enabled to count 8 minute cycles for as long as PS2 is low. At the end of each 8 minute cycle a TEST CONDUCTIVITY output command is asserted for 4 seconds.

The test memory flip-flop 82 receives the TEST RESULT input signal from the analog ASIC and at the start of the 4th second of the test using the COPY pulse generated in the test divider 94 as described above this test result is copied into the flip-flop. The output of this flip-flop provides the SERVICE REQUIRED status output signal to allow the analog ASIC to flash the red "service required" LED if the most recent conductivity test failed and the reservoir is still filling. These 8 minute cycles continue one after another for as long as the reservoir is filling as indicated by PS2 remaining closed. Once PS2 opens, the conductivity test memory flip-flop 82 and the conductivity test divider 94 are reset and held there.

A (speedup) multiplexer 86 incorporates electronic switches ES1 and ES2 to allow the functions of the test conductivity divider chain 94 to be sped up for chip testing and system adjustment. When the electronic switches are in the FAST position, the test conductivity divider 94 takes its input directly from the clock via ES2. Since this effectively bypasses the 5 stages of the 7-stage divider 92 that normally separates the clock 88 and the 2-stage divider 92 in the test conductivity chain, sequences are speeded up by a factor of 32. The Electronic switch ES1 connects the 7-stage divider 90 in the test conductivity divider chain to the output of the 2-stage divider 92 to complete a 32x speedup of the entire test conductivity divider chain.

Three status outputs for the yellow "no pressure," green "filling" and red "service required." LED's enable the analog ASIC to flash those LED's whose status outputs from the digital ASIC are at a high impedance when the LED strobe signal goes low. The TEST CONDUCTIVITY output is low for 8 minutes, then high (impedance) for the 4 seconds' duration of the test.

The PS2 input is inverted high to low and low to high at the "FILLING" status output so that a flashing green LED will indicate a closed status of PS2 and hence a reservoir fill cycle in process. An open or high state of PS2 will also hold at reset, the conductivity test divider, and the conductivity test memory flip-flop.

While a preferred embodiment of the invention has been shown and described with particularity, it will be appreciated that various changes and modifications may suggest themselves to one having ordinary skill in the art upon being apprised of the present invention. It is intended, therefore, to encompass all such changes and modifications as fall within the scope and spirit of the appended claims.

We claim:

1. An electronic controller for use in a water purifying unit of the type having a tap water inlet, a purified water outlet, reservoir, a filter interposed between the inlet and outlet through which the tap water passes for purification, a first conductivity probe in the tap water for sensing the conductivity of the tap water, and a second conductivity probe in the purified water for sensing the conductivity of the purified water, the electronic controller comprising:
   electrical pulse means activated by a power signal coupled to the input of the first and second conductivity probes for applying electrical pulses thereto resulting in output signals from each conductivity probe that are indicative of the impurity concentration of the water in which it is immersed;
   amplifying means activated by a power signal coupled to said first and second conductivity probes for amplifying the output signals from each of said conductivity probes by a predetermined gain to provide output signals which are approximately equal when the filter is all right; and
   comparing means activated by a power signal for comparing the output signals from said amplifying means and for generating a signal indicative of a needed filter change when the output signals differ in a first direction and a signal indicative that the filter is ok when the output signals differ in a second direction; and
   power control means for periodically supplying a power signal to said electrical pulse means, said amplifying means and said comparing means.

2. An electronic controller according to claim 1 and further comprising:
   biasing network means interposed between said power control means said amplifier means and said comparator means for biasing said amplifier means and said comparator means into operation.

3. An electronic controller according to claim 1 and further comprising:
   indicating means responsive to the indicative signal from said comparing means for indicating when a filter needs to be changed.

4. An electronic controller according to claim 3 wherein said indicating means is activated by the power signal from said power control means.

5. An electronic controller according to claim 4 wherein said indicating means incorporates a strobing means for cycling said indicating means off and on when activated by the power signal from said power control means so as to conserve power.

6. An electronic controller according to claim 1 and further comprising:
a switch means responsive to the reservoir's being filled for activating said power control means to cause said power control means to commence to provide power.

7. An electronic controller according to claim 6 and further comprising:
conductivity test means responsive to said switch means for delaying the activation of said power control means until a fixed time after the start of the filling of the reservoir.

8. An electronic controller for detecting when a filter should be replaced in a water purifying unit of the type having a tap water inlet, a purified water outlet, a reservoir, a filter interposed between the inlet and outlet through which the tap water passes for purification, a first conductivity probe in the tap water for sensing the conductivity in the tap water, and a second conductivity probe in the purified water for sensing the conductivity of the purified water, the first and second conductivity probes having an electronic controller comprising:
electrical current source means coupled to inputs of the first and second conductivity probes for applying current pulses thereto resulting in a current output signal from each conductivity probe indicative of the impurity concentration of the water in which it is immersed;
a capacitor interposed between the inputs of the first and second conductivity probes and said electrical current source means to prevent direct current flow through the first and second conductivity probes;
means for converting the current output signals from the conductivity probes to voltage output signals;
means coupled to the converting means for amplifying the voltage output signal from the second conductivity probe by a predetermined gain causing the voltage output signal to be slightly below the voltage output signal from the first conductivity probe when the filter is all right; and
electrical comparing means for comparing the voltage output signals from the first and second conductivity probes following the converting and amplifying means and generating a positive output voltage as long as the voltage output signal from the first conductivity probe exceeds the voltage output signal from the second conductivity probe for indicating a filter that is all right, and generating a negative output voltage when the voltage output signal from the first conductivity probe is less than the voltage output signal from the second conductivity probe for indicating a dirty filter that should be replaced.

9. An electronic controller according to claim 8 wherein the converting means comprises; a pair of first and second amplifiers, with the current output signal from the first conductivity probe being fed into one of the first and second amplifiers and the current output signal from the second conductivity probe being fed into the other of the first and second amplifiers.

10. An electronic controller according to claim 9 wherein the means for amplifying the voltage output signal from the second conductivity probe comprises a third amplifier.

11. An electronic controller according to claim 10 wherein the electrical comparing means comprises a comparator for comparing the voltage output signals from one of the first and second amplifiers and the third amplifiers.

12. An electronic controller according to claim 11 wherein the current pulses applied to the first and second conductivity probes have negative and positive polarities, and wherein means are provided coupled to the comparator for shorting the comparator while the negative polarities are applied to the comparator.

13. An electronic controller according to claim 12 wherein the shorting means for the comparator comprises a transistor.

14. An electronic controller according to claim 13 wherein a second transistor is provided coupled to the comparator for rectifying the positive polarities, and wherein a capacitor is coupled to the second transistor and is positively charged by the rectified positive polarities.

15. An electronic controller according to claim 14 wherein a second comparator is provided coupled to the second transistor and the comparator for monitoring the charge on the comparator and generating a positive output as long as the capacitor is positively charged indicating that the filter is all right, and generating a negative output when the capacitor is discharged indicating that the filter is dirty and should be replaced.

16. An electronic controller according to claim 15 wherein a third transistor is coupled to the output of the second comparator for generating a low impedance by clamping the output ground when the filter is all right, and generating a high impedance when the filter is dirty and should be replaced.

17. An electronic controller according to claim 16 wherein an electronic storing and command means is provided, and the output from the third transistor is fed into the storing means.

18. An electronic controller according to claim 17 wherein the electronic storing and command means generates a four-second signal every 8 minutes which is fed into the electrical current source means.

19. An electronic controller according to claim 18 wherein the electronic storing and command means generates a limited time window within which the output from the third transistor is sampled and a service required status signal is generated.

20. An electronic controller according to claim 19, and further comprising indicating means responsive to the electronic storing and command means and to the service required status signal for intermittently indicating that the filter is dirty and should be replaced.

21. An electronic controller according to claim 20 wherein the indicating means comprises a light-emitting diode, and an oscillator circuit electrically coupling the electronic storing and command means to the light-emitting diode for actuating the light-emitting diode with a short pulse of several milliseconds duration every 2 seconds.

22. The electronic controller according to claim 21 wherein the purified water outlet means has a first normally open pressure switch that closes when the reservoir is filling, and the tap water inlet means has a second normally open pressure switch that closes when the tap water is under sufficient input pressure, and an oscillator circuit is coupled with the light-emitting diode only when the first pressure switch is closed.

23. The electronic controller according to claim 22 wherein the electronic storing and command means and said first pressure switch cooperate to give a limited time window of one second for every eight minutes in which the output signal from the third transistor is monitored to indicate whether the filter should be replaced.

24. The electronic controller according to claim 23 wherein the time window allows the filling cycle to commence for several minutes before any output signal from the third transistor is monitored to allow the conductivity probes to reach equilibrium temperature before such monitoring, and to avoid initial overshooting of the signal.

25. The electronic controller according to claim 24, and further comprising a power supply including a battery and a common ground regulator for providing a common ground potential midway between the positive battery potential and the negative battery potential so that the electronic controller is insensitive to a drop in battery voltage of about one-third.

* * * * *